United States Patent
Samsodin et al.

(10) Patent No.: US 12,473,322 B2
(45) Date of Patent: Nov. 18, 2025

(54) POLYMERIC AMPHOTERIC SURFACTANT COMPOUND

(71) Applicant: Petroliam Nasional Berhad (PETRONAS), Kuala Lumpur (MY)

(72) Inventors: Normawati Samsodin, Kuala Lumpur (MY); Sara Shahruddin, Kuala Lumpur (MY); Nur Liyana Ismail, Kuala Lumpur (MY); Navin Sharma Karam Chand, Kuala Lumpur (MY); Jun Xing Leong, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 568 days.

(21) Appl. No.: 17/915,843

(22) PCT Filed: Mar. 31, 2021

(86) PCT No.: PCT/MY2021/050021
§ 371 (c)(1),
(2) Date: Sep. 29, 2022

(87) PCT Pub. No.: WO2021/201669
PCT Pub. Date: Oct. 7, 2021

(65) Prior Publication Data
US 2023/0151044 A1    May 18, 2023

(30) Foreign Application Priority Data

Apr. 1, 2020 (MY) ................ 2020001676

(51) Int. Cl.
*C07H 15/04*  (2006.01)
*C07H 1/00*   (2006.01)
*C07H 15/12*  (2006.01)
*C07H 15/14*  (2006.01)

(52) U.S. Cl.
CPC .............. *C07H 15/14* (2013.01); *C07H 1/00* (2013.01); *C07H 15/04* (2013.01); *C07H 15/12* (2013.01)

(58) Field of Classification Search
None
See application file for complete search history.

(56) References Cited

U.S. PATENT DOCUMENTS

| 6,121,430 A | 9/2000 | Linhardt et al. |
| 6,821,939 B1 | 11/2004 | Szewczyk et al. |
| 6,958,315 B1 | 10/2005 | Anderson et al. |
| 7,655,611 B2 * | 2/2010 | Wang ............ C07H 13/04 424/70.13 |
| 8,680,313 B1 | 3/2014 | Berger et al. |
| 2011/0312865 A1 | 12/2011 | Hodge et al. |

FOREIGN PATENT DOCUMENTS

| CN | 106268494 A | 1/2017 |
| CN | 105439909 B | 5/2017 |
| CN | 109207132 A | 1/2019 |
| EP | 2270122 B1 | 1/2015 |
| FR | 2840306 A1 | 12/2003 |
| JP | H04225995 A | 8/1992 |
| JP | 2000219670 A | 8/2000 |
| WO | 2014/077960 A1 | 5/2014 |

OTHER PUBLICATIONS

Chen et al., Langmuir, 35, pp. 1475-1482, 2019. (Year: 2019).*
European Search Report for EP Patent Application No. 21780858.3 (Nov. 6, 2023).
Solvay Personal Care Solutions Guide Brochure, 84 pages (2018).
Geetha et al., "Alkyl Poly Glucosides (APGs) Surfactants and their Properties: A Review," Tenside Surf. Det. 49 (5):417-427 (2012).
Search Report and Examination Result for United Arab Emirates Application No. P6002015/2022.
English Translation of Office Action for Japan Application No. 2022-559632 (dated Dec. 10, 2024).
Chen et al., "Differences in Zwitterionic Sulfobetaine and Carboxybetaine Dextran-Based Hydrogels," Langmuir 35:1475-1482 (2019).
International Search Report and Written Opinion for International Application No. PCT/MY2021/050021 (mailed Aug. 3, 2021).
Suhaimi et al., "Synthesis and Physicochemical Characterization of Cationic Polymeric Surfactant From Dioscorea Pyrifolia Starch," Malaysian J. of Analytical Sci. 20(6):1278-1285 (2016).
Hong et al., "Surface Properties and Synthesis of the Cellulose-Based Amphoteric Polymeric Surfactant," Carbohydrate Polymers 69:625-630 (2007).

* cited by examiner

*Primary Examiner* — Traviss C McIntosh, III
(74) *Attorney, Agent, or Firm* — Troutman Pepper Locke LLP (Rochester)

(57) ABSTRACT

Disclosed herein is a polymeric amphoteric surfactant compound of formula (I).

20 Claims, 2 Drawing Sheets

POLYMERIC AMPHOTERIC SURFACTANT COMPOUND

This application is a national stage application under 35 U.S.C. § 371 of PCT Application No. PCT/MY2021/050021, filed Mar. 31, 2021, which claims the priority benefit of Malaysia Patent Application No. PI 2020001676, filed Apr. 1, 2020.

FIELD OF INVENTION

The current invention relates to a polymeric amphoteric surfactant compound, particularly those derived from carbohydrates.

BACKGROUND

The listing or discussion of a prior-published document in this specification should not necessarily be taken as an acknowledgement that the document is part of the state of the art or is common general knowledge.

Carbohydrate-based surfactants are environmentally-friendly and biodegradable surfactants developed from carbohydrates and vegetable oils. Alkyl polyglycoside (APG) is a specific non-ionic carbohydrate-based surfactant prepared from glucose and fatty alcohol. However, currently-available carbohydrate-based surfactants do not necessarily show good performance in terms of foaming, viscosity thickening, surface tension (or critical micelle concentration), wetting and/or water solubility. As they generally produce lower quality foams, particularly in the presence of oil and hard water, they may not be suitable for enhanced oil recovery applications. In addition, they are known to have a higher irritancy potential in personal care applications.

Amphoteric surfactants can be derived from carbohydrate-based surfactants. Sultaines and betaines are two such examples. Generally, sultaines are preferred over betaines as they have a lower skin irritation potential. However, there is still a need for improved surfactant compositions that address one or more problems mentioned above.

SUMMARY OF INVENTION

Aspects and embodiments of the invention are described in the following clauses.

1. A polymeric amphoteric surfactant compound having chemical formula I:

wherein:
$R_1$ represents a $C_8$ to $C_{22}$ alkyl group, a —$((CH_2)_2O)_o$—$R_5$ group, a —$((CH(CH_3)CH_2)_pO)$—$R_6$ group a —$((CH_2)_2O)_q$—$((CH(CH_3)CH_2)_rO)$—$R_7$ group, or a —$((CH(CH_3)CH_2)_qO)$—$((CH_2)_2O)_{r'}$—$R_8$ group;

o and p each independently represent a number from 2 to 8;
q, q', r and r' each independently represent a number from 1 to 5;
$L_1$ to $L_3$ each independently represent a $C_1$ to $C_3$ alkyl group;
$R_2$ and $R_3$ each independently represent a $C_1$ to $C_3$ alkyl group;
$R_4$ represents OH or a $C_1$ to $C_3$ alkyl group;
$R_5$ to $R_8$ each independently represent a $C_8$ to $C_{22}$ alkyl group;
n represents a number from 1 to 5 and m represents a number from 0 to 4, where the sum of n+m is from 1 to 5, provided that n is at least 1.

2. The polymeric amphoteric surfactant compound according to Clause 1, wherein $R_1$ represents a $C_8$ to $C_{16}$ alkyl group, such as a $C_8$ to $C_{14}$ alkyl group, such as a $C_8$ to $C_{12}$ alkyl group or a $C_{12}$ to $C_{14}$ alkyl group.

3. The polymeric amphoteric surfactant compound according to Clause 2, wherein $R_1$ represents a $C_8$, $C_{10}$, $C_{12}$, $C_{14}$ or $C_{16}$ alkyl group, optionally wherein $R_1$ represents a $C_8$, $C_{10}$ or $C_{12}$ alkyl group.

4. The polymeric amphoteric surfactant compound according to Clause 1, wherein $R_1$ represents a —$((CH_2)_2O)_o$—$R_5$ group, a —$((CH(CH_3)CH_2)_pO)$—$R_6$ group a —$((CH_2)_2O)_q$—$((CH(CH_3)CH_2)_rO)$—$R_7$ group, or a —$((CH(CH_3)CH_2)_qO)$—$((CH_2)_2O)_{r'}$—$R_8$ group.

5. The polymeric amphoteric surfactant compound according to Clause 4, wherein:
o and p each independently represent a number from 3 to 5; and
q, q', r and r' each independently represent a number from 1 to 3.

6. The polymeric amphoteric surfactant compound according to Clause 4 or Clause 5, wherein $R_1$ represents a —$((CH_2)_2O)_o$—$R_5$ group or a —$((CH(CH_3)CH_2)_pO)$—$R_6$ group.

7. The polymeric amphoteric surfactant compound according to any one of the preceding clauses, wherein $R_2$ and $R_3$ are methyl.

8. The polymeric amphoteric surfactant compound according to any one of the preceding clauses, wherein:
$R_4$ represents OH; and/or
$R_5$ to $R_8$ each independently represent a $C_8$ to $C_{16}$ alkyl group.

9. The polymeric amphoteric surfactant compound according to any one of the preceding clauses, wherein:
$L_1$ represents $CH_2$; and/or
$L_2$ represents $(CH_2)_3$; and/or
$L_3$ represents $CH_2$.

10. A polymeric amphoteric surfactant formulation comprising one or more compounds of formula I as defined in any one of Clauses 1 to 9, wherein:
(a) when $R_1$ is a $C_8$ to $C_{22}$ alkyl group, then the formulation is formed of compounds of formula I having the same $R_1$ group or is formed from a mixture of compounds of formula I having different $R_1$ groups;
(b) when $R_1$ is a —$((CH_2)_2O)_o$—$R_5$ group, a —$((CH(CH_3)CH_2)_pO)$—$R_6$ group a —$((CH_2)_2O)_q$—$((CH(CH_3)CH_2)_rO)$—$R_7$ group, or a —$((CH(CH_3)CH_2)_qO)$—$((CH_2)_2O)_{r'}$—$R_8$ group, then the formulation is formed of compounds of formula I having the same $R_1$ group.

11. A composition comprising:
a polymeric amphoteric surfactant compound according to any one of Clauses 1 to 9; or a polymeric amphoteric surfactant formulation according to Clause 10.

12. A method of forming a compound according to formula I, the method comprising the step of reacting a compound for formula II:

with a compound of formula III:

in the presence of a suitable solvent and a suitable base, wherein:

$L_1$ to $L_3$, $R_1$ to $R_4$, n and m are as defined in any one of Clauses 1 to 9;

X is a leaving group (e.g. Cl, Br or I); and $Y^+$ is a monovalent metal cation (e.g. $Na^+$).

13. The method according to Clause 12, wherein the compound of formula II is formed by reaction of a compound of formula IV:

with a compound of formula V:

in the presence of a suitable solvent and a suitable base, wherein:

$L_1$, $L_2$, $R_1$ to $R_3$, n and m are as defined in any one of Clauses 1 to 9; and $R_9$ represents H or $C_1$ to $C_3$ alkyl.

14. The method according to Clause 13, wherein the compound of formula IV is formed by reaction of a compound of formula VI:

with a compound of formula VII:

in the presence of a suitable solvent and a suitable base, wherein:

$R_1$, n and m are as defined in any one of Clauses 1 to 9;

$R_9$ represents H or $C_1$ to $C_3$ alkyl;

X' represents a leaving group (e.g. Cl, Br or I); and $L_{1'}$ represents a bond or a $C_1$ to $C_2$ alkyl group.

DESCRIPTION

The current invention relates to novel polymeric amphoteric surfactant compounds. The current invention particularly relates to sultaines derived from carbohydrate-based surfactants. These compounds have a very mild odour and do not add colour to formulations they are added to. More-over, they produce dense foams with high stability when used in combination with other surfactants, and demonstrate excellent stability in both extreme acidic and alkaline conditions. These properties make them suitable for diverse applications such as personal care (e.g. skin care and deodorants), household and industrial products, and enhanced oil recovery. It is believed that they can replace conventional amphoteric surfactants such as betaines, amphoacetates and amphopropionates.

Thus in a first aspect of the invention, there is provided a polymeric amphoteric surfactant compound having chemical formula I:

wherein:
$R_1$ represents a $C_8$ to $C_{22}$ alkyl group, a $—((CH_2)_2O)_o—R_5$ group, a $—((CH(CH_3)CH_2)_pO)—R_6$ group a $—((CH_2)_2O)_q—((CH(CH_3)CH_2)_rO)—R_7$ group, or a $—((CH(CH_3)CH_2)_qO)—((CH_2)_2O)_{r'}—R_8$ group;
o and p each independently represent a number from 2 to 8;
q, q', r and r' each independently represent a number from 1 to 5;
$L_1$ to $L_3$ each independently represent a $C_1$ to $C_3$ alkyl group;
$R_2$ and $R_3$ each independently represent a $C_1$ to $C_3$ alkyl group;
$R_4$ represents OH or a $C_1$ to $C_3$ alkyl group;
$R_5$ to $R_8$ each independently represent a $C_8$ to $C_{21}$ alkyl group;
n represents a number from 1 to 5 and m represents a number from 0 to 4, where the sum of n+m is from 1 to 5, provided that n is at least 1.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

Unless otherwise stated, the term "alkyl" refers to an unbranched or branched, cyclic, saturated or unsaturated (so forming, for example, an alkenyl or alkynyl) hydrocarbyl radical, which may be substituted or unsubstituted (with, for example, one or more halo atoms).

It will be appreciated that in embodiments of the invention, the alkyl group may have an acyclic part and a cyclic part. When the alkyl group contains a cyclic portion group (which may be where the group "cycloalkyl" is specified), then the cyclic portion is preferably $C_{3-12}$ cycloalkyl and, more preferably, $C_{5-10}$ (e.g. $C_5$-7) cycloalkyl. In said embodiments, the remaining acrylic portion may be $C_{1-22}$ linear or $C_{4-22}$ branched acyclic alkyl that is saturated or unsaturated.

Unless otherwise specified herein, where the term "alkyl" refers to an acyclic group, it is preferably $C_{1-22}$ alkyl.

As noted herein before, $R_1$ may be an alkyl group (i.e. a $C_8$ to $C_{22}$ alkyl group) or an alkoxy group (i.e. a $—((CH_2)_2O)_o—R_5$ group, a $—((CH(CH_3)CH_2)_pO)—R_6$ group a $—((CH_2)_2O)_q—((CH(CH_3)CH_2)_rO)—R_7$ group, or a $—((CH(CH_3)CH_2)_qO)—((CH_2)_2O)_{r'}—R_8$ group). When $R_1$ is a $C_8$ to $C_{22}$ alkyl group, the term alkyl may be construed broadly to cover the definitions provided hereinbefore. However, in particular embodiments of the invention that may be mentioned herein, the $C_8$ to $C_{22}$ alkyl group may refer to a linear or branched, saturated or unsaturated hydrocarbyl group. In yet more particular embodiments of the invention, the $C_8$ to $C_{22}$ alkyl group may refer to a branched or, yet more particularly, a linear saturated hydrocarbyl group.

Any possible degree of branching is contemplated and said branched alkyl groups may be obtained from any suitable method. For example, suitable branched alkyl chains may be obtained by use of the Guerbet Reaction between two primary alkyl alcohols. Examples of suitable branched alkyl alcohols that may be used to provide the $R_1$ groups mentioned herein following the reaction pathways discussed below include, but are not limited to: 2-methyl-1-pentanol, 2-ethyl-1-hexanol, 2-propyl-1-heptanol, 2-butyl-1-octanol, 2-pentyl-1-nonanol, 2-hexyl-1-decanol, 2-heptyl-1-undecanol, 2-octyl-1-dodecanol, 2-nonyl-1-tridecanol, 2-decyl-1-tetradecanol, 2-undecyl-1-pentadecanol, 2-dodecyl-1-hexadecanol, 2-tridecyl-1-heptadecanol, 2-tetradecyl-1-octadecanol, 2-pentadecyl-1-nonadecanol, 2-hexadecyl-1-eicosanol, 2-heptadecyl-1-heneicosanol, 2-octadecyl-1-docosanol, 2-nonadecyl-1-tricosanol, and 2-eicosyl-1-tetracosanol.

In embodiments of the invention that may be mentioned herein, when $R_1$ is an alkyl group, it may be a $C_8$ to $C_{16}$ alkyl group, such as a $C_8$ to $C_{14}$ alkyl group, such as a $C_8$ to $C_{12}$ alkyl group or a $C_{12}$ to $C_{14}$ alkyl group. For example, $R_1$ may represent a $C_8$, $C_{10}$, $C_{12}$, $C_{14}$ or $C_{16}$ alkyl group, such as a $C_8$, $C_{10}$ or $C_{12}$ alkyl group. Again, these groups may be branched or, more particularly, linear alkyl groups.

In embodiments of the invention where $R_1$ is an alkoxy group, it may be a $—((CH_2)_2O)_o—R_5$ group, a $—((CH(CH_3)CH_2)_pO)—R_6$ group a $—((CH_2)_2O)_q—((CH(CH_3)CH_2)_rO)—R_7$ group, or a $—((CH(CH_3)CH_2)_{q'}O)—((CH_2)_2O)_{r'}—R_8$ group. For example, $R_1$ may represent a $—((CH_2)_2O)_o—R_5$ group or a $—((CH(CH_3)CH_2)_pO)—R_6$ group.

As mentioned above, o and p may each independently represent a number from 2 to 8. For example, o and p may each independently represent a number from 3 to 5. As mentioned above, q, q', r and r' may each independently represent a number from 1 to 5, for example, q, q', r and r' may each independently represent a number from 1 to 3.

Any suitable $C_1$-$C_3$ alkyl group may be $R_2$ and $R_3$ (e.g. methyl, ethyl, propyl and isopropyl). However, in particular embodiments of the invention that may be mentioned herein, $R_2$ and $R_3$ may both be a methyl group.

As noted above, $R_4$ may represent OH. In addition or independently, $R_5$ to $R_8$ may each independently represent a $C_8$ to $C_{16}$ alkyl group.

The L groups mentioned hereinbefore ($L_1$ to $L_3$) may each represent a suitable linking group selected from a $C_1$ to $C_3$ alkyl group ($CnH_{2n-2}$). Examples of suitable linking groups include $CH_2$, $(CH_2)_2$ and $(CH_2)_3$. In particular embodiments of the invention that may be mentioned herein:

$L_1$ may represent $CH_2$; and/or
$L_2$ may represent $(CH_2)_3$; and/or
$L_3$ may represent $CH_2$.

In particular embodiments of the invention, n may be 1 and m may be 0.

In a particular embodiment of the invention, the compound of formula I is:

wherein:
$R_1$ represents a $C_{12}$ or $C_{14}$ alkyl group; and
n represents a number from 1 to 5 and m represents a number from 0 to 4, where the sum of n+m is from 1 to 5, provided that n is at least 1.

It will be appreciated that the above-mentioned embodiments may be combined in any suitable combination that is technically sensible.

As will be appreciated, one or more of the polymeric amphoteric surfactants of formula I may be combined together to provide a polymeric amphoteric surfactant formulation. This may be particularly the case where $R_1$ is selected from an alkyl group, as a mixture of different alkyl groups may be used to provide compounds of formula I. In which case a mixture of different compounds of formula I are provided as the reaction product (discussed in more detail below in the examples). Thus, in another aspect of the invention, there is provided a polymeric amphoteric surfactant formulation comprising one or more compounds of formula I as defined above such that:

(i) when $R_1$ is a $C_8$ to $C_{22}$ alkyl group, then the formulation is formed of compounds of formula I having the same $R_1$ group or is formed from a mixture of compounds of formula I having different $R_1$ groups; and (j) when $R_1$ is a —$((CH_2)_2O)_o$—$R_5$ group, a —$((CH(CH_3)CH_2)_pO)$—$R_6$ group a —$((CH_2)_2O)_q$—$((CH(CH_3)CH_2)_rO)$—$R_7$ group, or a —$((CH(CH_3)CH_2)_qO)$—$((CH_2)_2O)_r$—$R_8$ group, then the formulation is formed of compounds of formula I having the same $R_1$ group.

The above is intended to refer to the reaction products obtained from the reactions conducted below. As will be appreciated, the compounds of formula I can be mixed together after formation in any suitable ratio should that be desired to produce additional formulations.

In a further aspect of the invention, there is provided a composition comprising a polymeric amphoteric surfactant compound of chemical formula I as defined above; or a polymeric amphoteric surfactant formulation as defined above. Such compositions may be a foaming composition for use in oil recovery operations, a household or industry cleaning composition, or a composition for use in personal care (for example, a hair shampoo composition or deodorant composition).

The composition for use in oil recovery operations may comprise from 5 to 90% by weight of the polymeric amphoteric surfactant compound of chemical formula I as defined above; or a polymeric amphoteric surfactant formulation as defined above.

The household or industry cleaning composition may comprise from 5 to 50% by weight of the polymeric amphoteric surfactant compound of chemical formula I as defined above; or a polymeric amphoteric surfactant formulation as defined above.

The composition for use in personal care may comprise from 5 to 30% by weight of the polymeric amphoteric surfactant compound of chemical formula I as defined above; or a polymeric amphoteric surfactant formulation as defined above.

A further aspect of the invention relates to the formation of the compounds of formula I disclosed hereinbefore. Thus, there is also disclosed a method of forming a compound according to formula I, the method comprising the step of reacting a compound for formula II:

with a compound of formula III:

in the presence of a suitable solvent and a suitable base, wherein:
$L_1$ to $L_3$, $R_1$ to $R_4$, n and m are as defined above;
X is a leaving group (e.g. Cl, Br or I); and
$Y^+$ is a monovalent metal cation (e.g. $Na^+$).

In such embodiments, the method may be conducted such that the compound of formula II is formed by reaction of a compound of formula IV:

IV with a compound of formula V:

V in the presence of a suitable solvent and a suitable base, wherein:

$L_1$, $L_2$, $R_1$ to $R_3$, n and m are as defined above; and

$R_9$ represents H or $C_1$ to $C_3$ alkyl.

In further embodiments, the method may be conducted such that the wherein the compound of formula IV is formed by reaction of a compound of formula VI:

VI with a compound of formula VII:

VII in the presence of a suitable solvent and a suitable base, wherein:

$R_1$, n and m are as defined above;

$R_9$ represents H or $C_1$ to $C_3$ alkyl;

X' represents a leaving group (e.g. Cl, Br or I); and $L_{1'}$ represents a bond or a $C_1$ to $C_2$ alkyl group.

In particular embodiments of the invention, the compound of formula VI is FM600/FM1200 (CAS: 110615-47-9). The degree of polymerisation of the compound is from 1.4 to 1.6, and m and n may be defined accordingly.

Further aspects and embodiments of the invention are provided in the following non-limiting examples.

EXAMPLES

Materials and Methods

The materials were purchased from the sources as provided below.

Alkyl polyglycoside (APG)—two specific APGs from Fenchem Biotek were used.
  i. FM600/FM1200—solid content: 50 wt % in water (CAS: 110615-47-9) with the following composition:
     C10: <1.0%;
     C12: 70-76%;
     C14: 24-30%; and
     C16: <1.0%.
  ii. FM425N (CAS: 68515-73-1 & 110615-47-9) with the following composition:
     C8: 29-35%;
     C10: 25-32%;
     C12: 27-33%;
     C14: 7-13%; and
     C16: 1.0% max Sodium methoxide (Sigma-Aldrich, CAS 124-41-4, 95% purity, powder)

Ethyl chloroacetate (Sigma-Aldrich, CAS 105-39-5, 99% purity)

3-(dimethylamino)-1-propylamine (Sigma-Aldrich, CAS-109-55-7, 98% purity)

3-chloro-2-hydroxypropanesulfonic acid sodium salt (Sigma-Aldrich or Alfa Aesar, PubChem Substance ID 329786196, 98% purity)

$^1$H NMR was recorded on a Bruker 400 MHz Spectrometer.

All reactions were performed under nitrogen atmosphere unless expressly stated.

When provided, conversion values are the percentage of the amount of target products and byproducts (if any) over the amount of starting material. Yield values are the percentage of the amount of target products only over the amount of starting material.

Chloride content was analysed to determine reaction completion and was conducted in accordance to APHA Method 4500-Cl; method validation was performed to confirm that it is suitable for surfactant sample matrix.

Free amine content was analysed to determine reaction completion and was conducted in accordance to ASTM 2074; method validation is in-progress to confirm that it is suitable for surfactant sample matrix.

Example 1

Figure 1:
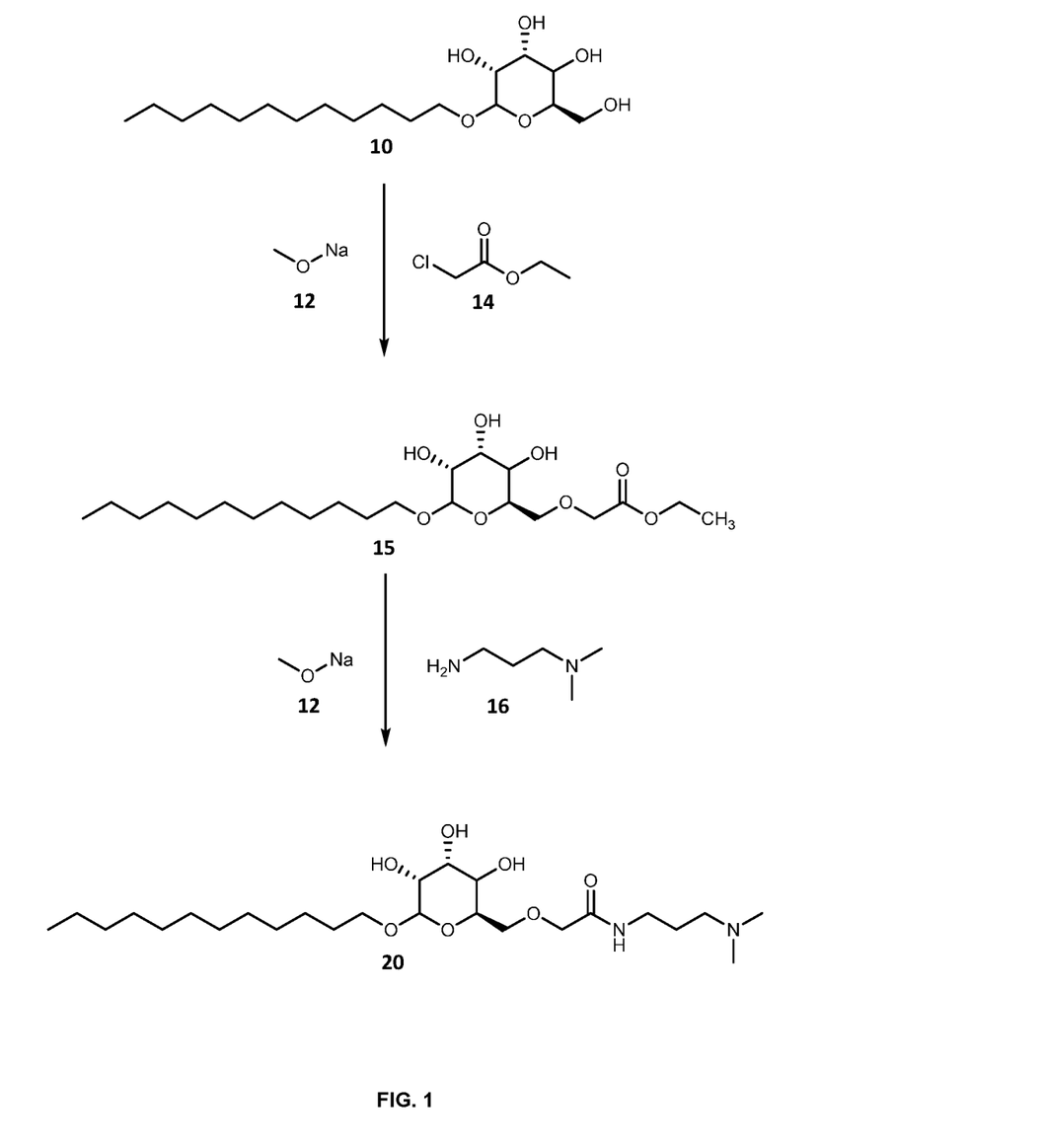
FIG. 1 depicts a schematic representation of the current invention to prepare intermediate 20 by subjecting an alkyl polyglycoside (10) to a two-step amination reaction.
Figure 2:
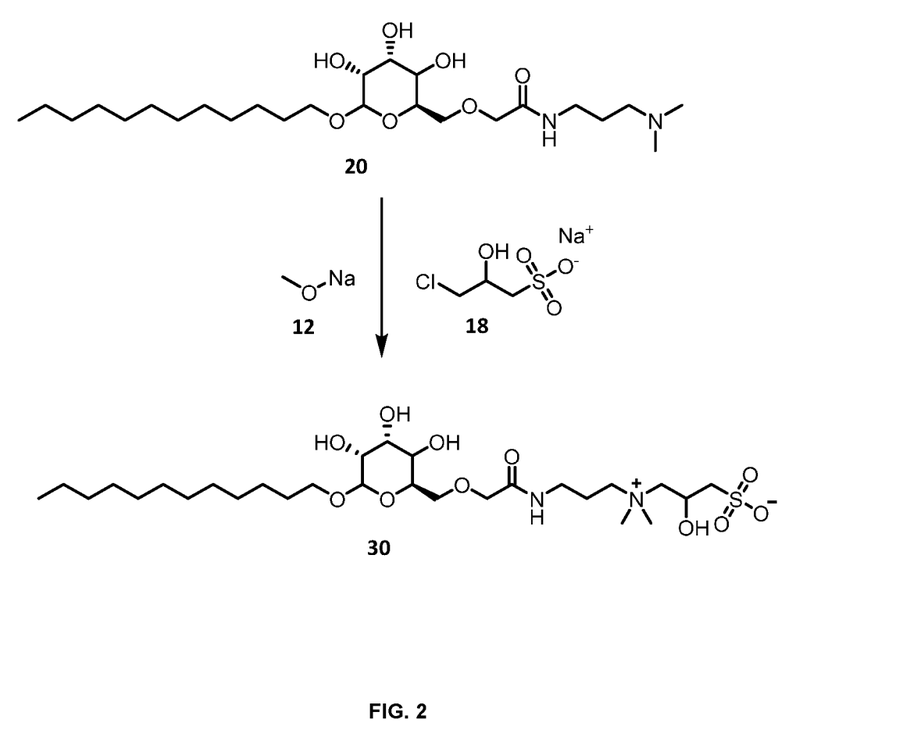
FIG. 2 depicts a schematic representation of the current invention to prepare compound 30 by subjecting intermediate 20 to a sulfonation reaction.

Compound 30 was synthesized according to the schematic representations of FIG. 1 and FIG. 2. An alkyl polyglycoside 10 is first subjected to a two-step amination reaction to give a tertiary-amine intermediate 20. The intermediate 20 is then subjected to a sulfonation reaction to give an alkyl polyglycoside-based sultaine 30.

Synthesis and Characterisation of 15

Typically, an alkyl polyglycoside (FM600/FM1200; 10; 50 g, 0.1297 mol) and water (50 ml) were introduced to a 4-neck round bottom flask equipped with an agitator, thermometer, a water-cooled condenser and a sparger for introducing nitrogen. Sodium methoxide (12; 6.8 g, 0.1261 mol) and ethyl chloroacetate (14; 15.5 g, 0.1261 mol) were added to the flask and the resulting mixture was heated to about 85° C. to 90° C. and maintained for about 4 to 6 hours to form a reaction solution containing 15 (about 97% yield). The reaction was monitored by chloride content analysis and stopped when the theoretical chloride content is reached. The resulting product 15 was characterised by $^1$H NMR. $^1$H NMR (400 MHz, Methanol-$d_4$) δ 4.79 (d, J=3.8 Hz, 1H), 4.35-4.15 (m, 1H), 4.00-3.10 (m, 11H), 1.70-1.06 (m, 26H), 1.06-0.75 (m, 3H).

The formation of 15 was confirmed by the presence of peaks at the 4.1 to 4.4 ppm region in the $^1$H NMR spectrum, which correspond to the hydrogens present in the moiety 14 that is incorporated in the glycoside.

Synthesis and Characterisation of 20

Typically, 3-(dimethylamino)-1-propylamine (16; 12.2 g, 0.1198 mol) was added to the reaction solution containing 15 (about 55 g, 0.1261 mol) from the first step. While sodium methoxide 12 is a reactant/catalyst for forming 20, there is no further addition of sodium methoxide 12 in this step (i.e. 12 present in the reaction solution with 15 comes from the first step). The reaction mixture was then heated to about 85° C. to 90° C. and maintained for about 4 to 6 hours to form a solution of 20 (>80% yield and >90% conversion). The reaction was monitored by free amine analysis and stopped when the free amine value is less than about 0.5 wt %. The resulting product 20 was characterised by $^1$H NMR. $^1$H NMR (400 MHz, Methanol-$d_4$) δ 8.56 (s, 1H), 4.79 (d, J=3.8 Hz, 1H), 4.27 (d, J=7.8 Hz, 1H), 4.00-3.11 (m, 14H), 2.45-2.35 (m, 4H), 2.27 (s, 12H), 1.71 (p, J=7.3 Hz, 4H), 1.31 (d, J=5.5 Hz, 24H), 0.96-0.87 (m, 3H).

The formation of 20 was confirmed by the presence of a peak at 8.56 ppm, corresponding to the tertiary amine group.

Synthesis and Characterisation of 30

Typically, 3-chloro-2-hydroxypropanesulfonic acid sodium salt (18; 24.64 g, 0.1198 mol) was added to the reaction solution containing 20 from the second step. The reaction mixture was then heated to about 85° C. to 90° C. and maintained for about 5 to 7 hours to form a solution of 30 (yield is about 93-95%). The reaction was monitored by chloride content analysis and stopped when the theoretical chloride content is reached. The resulting product 30 was characterised by $^1$H NMR. $^1$H NMR (400 MHz, Methanol-$d_4$) δ 8.56 (s, 1H), 4.83-4.75 (m, 1H), 4.39-4.17 (m, 1H), 4.00-3.13 (m, 15H), 3.09-2.55 (m, 7H), 1.86-1.75 (m, 2H), 1.70-1.57 (m, 2H), 1.31 (d, J=5.1 Hz, 17H), 0.95-0.87 (m, 3H).

The formation of 30 was confirmed by chemical shifts corresponding to the two methyl groups (—$CH_3$) attached to the nitrogen atom in the 2.92 to 3.06 ppm, and a downfield peak at 3.2 ppm corresponding to the $CH_2$ next to the nitrogen atom having two methyl groups.

Comparative Example 1

Compound 20 was synthesized from 10 by the procedure of Example 1 except ethyl choloroacetate (14) was replaced with chloroacetic acid. However, this results in an exothermic reaction with reduced yield (>80% conversion and >74% yield).

Without wishing to be bound by theory, it is believed that the use of ethyl choloroacetate (14) promotes site-selective amination at the C6 position of the alkyl polyglycoside and reduces the formation of byproducts and mixtures.

Comparative Example 2

Instead of a two-step amination reaction outlined in Example 1, a one-step amination reaction can be achieved by reacting 10 with 3-dimethylamino-1-propyl chloride hydrochloride. This also results in reduced yield and conversion (>75% conversion and >70% yield). In addition this reaction is not economically viable as 3-dimethylamino-1-propyl chloride hydrochloride is an expensive reactant.

Comparative Example 3

3-(dimethylamino)-1-propylamine (16) can be replaced by chloroamine. However, the use of chloroamine is not economically viable due to its cost.

Example 2

Performance evaluation is being carried out for the surfactants (including 20). They include foaming, mildness test (Zein test), viscosity thickening, surface tension & CMC and wetting.

The invention claimed is:

1. A polymeric amphoteric surfactant compound having chemical formula I:

wherein:
$R_1$ represents a $C_8$ to $C_{22}$ alkyl group, a —$((CH_2)_2O)_o$—$R_5$ group, a —$((CH(CH_3)CH_2)_pO)$—$R_6$ group, a —$((CH_2)_2O)_q$—$((CH(CH_3)CH_2)_rO)$—$R_7$ group, or a —$((CH(CH_3)CH_2)_qO)$—$((CH_2)_2O)_{r'}$—$R_8$ group;

o and p each independently represent a number from 2 to 8;

q, q', r and r' each independently represent a number from 1 to 5;

$L_1$ to $L_3$ each independently represent a $C_1$ to $C_3$ alkyl group;

$R_2$ and $R_3$ each independently represent a $C_1$ to $C_3$ alkyl group;

$R_4$ represents OH or a $C_1$ to $C_3$ alkyl group;

$R_5$ to $R_8$ each independently represent a $C_8$ to $C_{22}$ alkyl group;

n represents a number from 1 to 5 and m represents a number from 0 to 4, where the sum of n+m is from 1 to 5, provided that n is at least 1.

2. The polymeric amphoteric surfactant compound according to claim 1, wherein $R_1$ represents a $C_8$ to $C_{16}$ alkyl group.

3. The polymeric amphoteric surfactant compound according to claim 2, wherein $R_1$ represents a $C_8$, $C_{10}$, $C_{12}$, $C_{14}$ or $C_{16}$ alkyl group.

4. The polymeric amphoteric surfactant compound according to claim 3, wherein $R_1$ represents a $C_8$, $C_{10}$ or $C_{12}$ alkyl group.

5. The polymeric amphoteric surfactant compound according to claim 1, wherein $R_1$ represents a —$((CH_2)_2O)_o$—$R_5$ group, a —$((CH(CH_3)CH_2)_pO)$—$R_6$ group, a —$((CH_2)_2O)_q$—$((CH(CH_3)CH_2)_rO)$—$R_7$ group, or a —$((CH(CH_3)CH_2)_qO)$—$((CH_2)_2O)_{r'}$—$R_8$ group.

6. The polymeric amphoteric surfactant compound according to claim 5, wherein:
   o and p each independently represent a number from 3 to 5; and
   q, q', r and r' each independently represent a number from 1 to 3.

7. The polymeric amphoteric surfactant compound according to claim 5, wherein $R_1$ represents a $-((CH_2)_2O)_o-R_5$ group or a $-((CH(CH_3)CH_2)_pO)-R_6$ group.

8. The polymeric amphoteric surfactant compound according to claim 1, wherein $R_2$ and $R_3$ are methyl.

9. The polymeric amphoteric surfactant compound according to claim 1, wherein:
   $R_4$ represents OH; and/or
   $R_5$ to $R_8$ each independently represent a $C_8$ to $C_{16}$ alkyl group.

10. The polymeric amphoteric surfactant compound according to claim 1, wherein:
    $L_1$ represents $CH_2$; and/or
    $L_2$ represents $(CH_2)_3$; and/or
    $L_3$ represents $CH_2$.

11. A polymeric amphoteric surfactant formulation comprising one or more compounds of formula I as defined in claim 1, wherein:
    (a) when $R_1$ is a $C_8$ to $C_{22}$ alkyl group, then the formulation is formed of compounds of formula I having the same $R_1$ group or is formed from a mixture of compounds of formula I having different $R_1$ groups;
    (b) when $R_1$ is a $-((CH_2)_2O)_o-R_5$ group, a $-((CH(CH_3)CH_2)_pO)-R_6$ group, a $-((CH_2)_2O)_q-((CH(CH_3)CH_2)_rO)-R_7$ group, or a $-((CH(CH_3)CH_2)_qO)-((CH_2)_2O)_{r'}-R_8$ group, then the formulation is formed of compounds of formula I having the same $R_1$ group.

12. The polymeric amphoteric surfactant compound according to claim 1, wherein $R_1$ represents a $C_8$ to $C_{12}$ alkyl group or a $C_{12}$ to $C_{14}$ alkyl group.

13. The polymeric amphoteric surfactant compound according to claim 1, wherein $R_1$ represents a $C_8$ to $C_{14}$ alkyl group.

14. A composition comprising:
    a polymeric amphoteric surfactant compound according to claim 1.

15. A composition comprising:
    a polymeric amphoteric surfactant formulation according to claim 11.

16. A method of forming a compound according to formula I:

the method comprising the step of reacting a compound for formula II:

with a compound of formula III:

in the presence of a suitable solvent and a suitable base, wherein:
$L_1$ to $L_3$, $R_1$ to $R_4$, n and m are as defined in claim 1;
X is a leaving group; and
$Y^+$ is a monovalent metal cation.

17. The method according to claim 16, wherein the compound of formula II is formed by reaction of a compound of formula IV:

with a compound of formula V:

in the presence of a suitable solvent and a suitable base, wherein:
$R_1$ represents a $C_8$ to $C_{22}$ alkyl group, a $-((CH_2)_2O)_o-R_5$ group, a $-((CH(CH_3)CH_2)_pO)-R_6$ group, a $-((CH_2)_2O)_q-((CH(CH_3)CH_2)_rO)-R_7$ group, or a $-((CH(CH_3)CH_2)_qO)-((CH_2)_2O)_{r'}-R_8$ group;
o and p each independently represent a number from 2 to 8;

q, q', r and r' each independently represent a number from 1 to 5;

$L_1$ and $L_2$ each independently represent a $C_1$ to $C_3$ alkyl group;

$R_2$ and $R_3$ each independently represent a $C_1$ to $C_3$ alkyl group;

n represents a number from 1 to 5 and m represents a number from 0 to 4, where the sum of n+m is from 1 to 5, provided that n is at least 1; and

$R_9$ represents H or $C_1$ to $C_3$ alkyl.

18. The method according to claim 17, wherein the compound of formula IV is formed by reaction of a compound of formula VI:

VI with a compound of formula VII:

VII in the presence of a suitable solvent and a suitable base, wherein:

$R_1$ represents a $C_8$ to $C_{22}$ alkyl group, a $-((CH_2)_2O)_o-R_5$ group, a $-((CH(CH_3)CH_2)_pO)-R_6$ group, a $-((CH_2)_2O)_q-((CH(CH_3)CH_2)_rO)-R_7$ group, or a $-((CH(CH_3)CH_2)_qO)-((CH_2)_2O)_{r'}-R_8$ group;

o and p each independently represent a number from 2 to 8;

q, q', r and r' each independently represent a number from 1 to 5;

n represents a number from 1 to 5 and m represents a number from 0 to 4, where the sum of n+m is from 1 to 5, provided that n is at least 1;

$R_9$ represents H or $C_1$ to $C_3$ alkyl;

X' represents a leaving group; and $L_{1'}$ represents a bond or a $C_1$ to $C_2$ alkyl group.

19. The method according to claim 18, wherein X' represents Cl, Br or I.

20. The method according to claim 16, wherein one or both of the following apply:

X is selected from Cl, Br or I; and $Y^+$ is $Na^+$.

* * * * *

UNITED STATES PATENT AND TRADEMARK OFFICE
CERTIFICATE OF CORRECTION

| | | |
|---|---|---|
| PATENT NO. | : 12,473,322 B2 | Page 1 of 1 |
| APPLICATION NO. | : 17/915843 | |
| DATED | : November 18, 2025 | |
| INVENTOR(S) | : Normawati Samsodin et al. | |

It is certified that error appears in the above-identified patent and that said Letters Patent is hereby corrected as shown below:

In the Claims

At Claim 1, Column 12, Line 39, delete "-((CH(CH$_3$)CH$_2$)$_{q'}$O)-((CH$_2$)$_2$O)$^{r'}$-R$_8$ group" and insert --((CH(CH$_3$)CH$_2$)$_{q'}$O)-((CH$_2$)$_2$O)$_{r'}$-R$_8$ group-- in its place.

At Claim 16, Column 13, Line 67, delete "for" and insert --of-- in its place.

Signed and Sealed this
Twenty-seventh Day of January, 2026

John A. Squires
*Director of the United States Patent and Trademark Office*